United States Patent [19]
Wicks et al.

[11] Patent Number: 5,637,507
[45] Date of Patent: *Jun. 10, 1997

[54] TETRAETHYL ORTHOSILICATE-BASED GLASS COMPOSITION AND METHOD

[75] Inventors: George G. Wicks; Ronald R. Livingston, both of Aiken; Lewis C. Baylor; Michael J. Whitaker, both of North Augusta, all of S.C.; Patrick E. O'Rourke, Martinez, Ga.

[73] Assignee: The United States of America as represented by the United States Department of Energy, Washington, D.C.

[*] Notice: The term of this patent shall not extend beyond the expiration date of Pat. No. 5,595,945.

[21] Appl. No.: 192,266

[22] Filed: Feb. 7, 1994

Related U.S. Application Data

[63] Continuation of Ser. No. 999,338, Dec. 31, 1992, abandoned, which is a continuation-in-part of Ser. No. 796,974, Nov. 25, 1991, Pat. No. 5,595,945, which is a continuation-in-part of Ser. No. 668,364, Mar. 13, 1991, abandoned, which is a division of Ser. No. 293,846, Jan. 5, 1989, abandoned.

[51] Int. Cl.⁶ .............................. G01N 21/75; C03C 3/00
[52] U.S. Cl. .................. 436/166; 436/169; 436/805; 422/82.06; 422/82.07; 501/12; 428/432; 428/433; 427/243; 427/246
[58] Field of Search .................. 501/12; 436/DIG. 805, 436/124, 139, 163, 166, 169, 125, 140, 141, 142, 83, 84; 422/82.06, 82.07; 252/315.01, 315.6; 427/246, 93, 243; 428/432, 433

[56] References Cited

U.S. PATENT DOCUMENTS

| | | | |
|---|---|---|---|
| 4,278,632 | 7/1981 | Yoldas | 264/66 |
| 4,397,666 | 8/1983 | Mishima et al. | 65/18.3 |
| 4,652,467 | 3/1987 | Brinker et al. | 427/246 |
| 4,788,046 | 11/1988 | Barringer et al. | 423/122 |
| 4,799,963 | 1/1989 | Basil et al. | 106/287.13 |
| 4,806,328 | 2/1989 | Van Lierop et al. | 423/338 |
| 4,816,299 | 3/1989 | Alpha et al. | 427/221 |
| 4,840,653 | 6/1989 | Rabinovich | 65/3.12 |
| 4,859,525 | 8/1989 | Hench et al. | 428/260 |
| 4,927,768 | 5/1990 | Coughlin et al. | 436/172 |
| 4,931,312 | 6/1990 | de Leeuw et al. | 427/64 |
| 4,961,767 | 10/1990 | Schermerhorn et al. | 65/2 |
| 5,200,334 | 4/1993 | Dunn et al. | 435/182 |

*Primary Examiner*—Nina Bhat
*Attorney, Agent, or Firm*—Brian R. Tumm; Harold M. Dixon; William R. Moser

[57] ABSTRACT

A tetraethyl orthosilicate-based, sol-gel glass composition with additives selected for various applications. The composition is made by mixing ethanol, water, and tetraethyl orthosilicate, adjusting the pH into the acid range, and aging the mixture at room temperature. The additives, such as an optical indicator, filler, or catalyst, are then added to the mixture to form the composition which can be applied to a substrate before curing. If the additive is an indicator, the light-absorbing characteristics of which vary upon contact with a particular analyte, the indicator can be applied to a lens, optical fiber, reagant strip, or flow cell for use in chemical analysis. Alternatively, an additive such as alumina particles is blended into the mixture to form a filler composition for patching cracks in metal, glass, or ceramic piping.

31 Claims, 4 Drawing Sheets

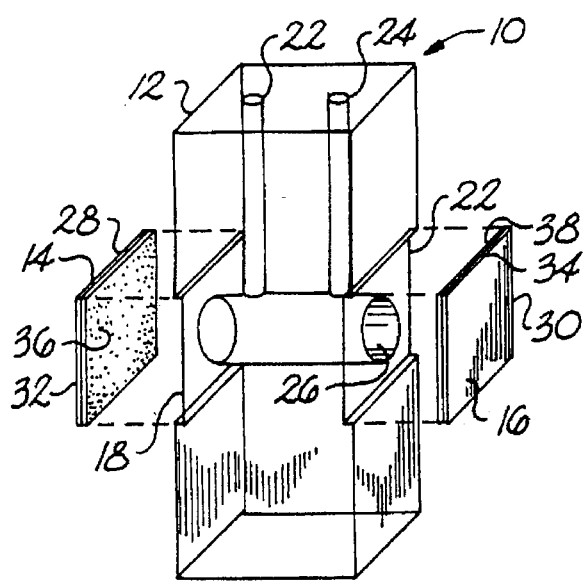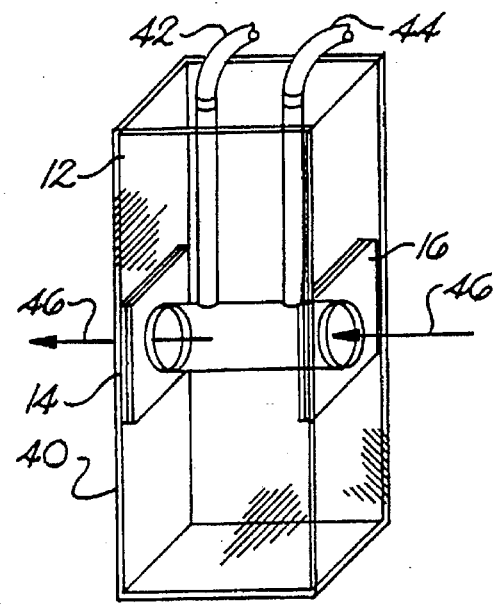
Fig. 3a  Fig. 3b
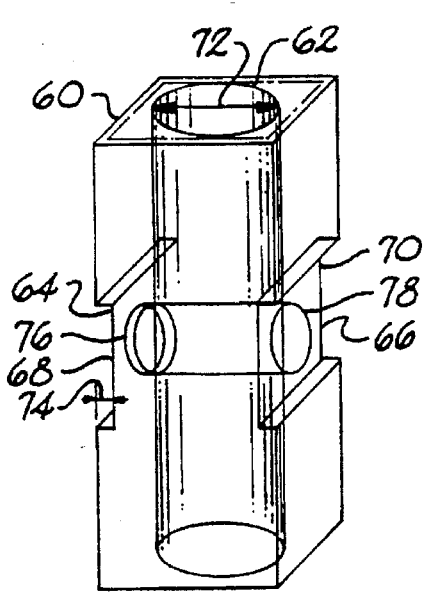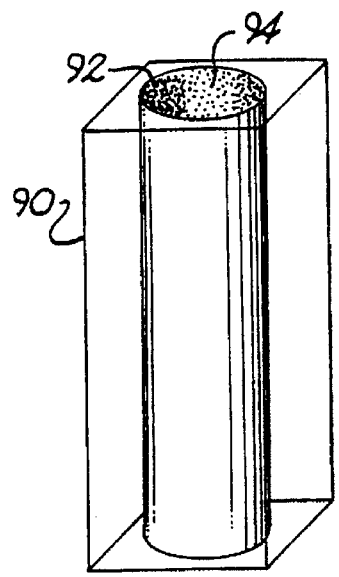
Fig. 6  Fig. 7

TETRAETHYL ORTHOSILICATE-BASED GLASS COMPOSITION AND METHOD

The United States Government has rights in this invention pursuant to Contract No. DE-AC09-89SR18035 between the U.S. Department of Energy and Westinghouse Savannah River Company.

This is a Continuation of application Ser. No. 07/999,338 filed Dec. 31, 1992, now abandoned, which is a continuation-in-part of application Ser. No. 796,974, filed Nov. 25, 1991 now U.S. Pat. No. 5,595,945, which is a continuation-in-part of application Ser. No. 668,364, filed Mar. 13, 1991 now abandoned, which is itself a division of application Ser. No. 293,846, filed Jan. 5, 1989 now abandoned.

BACKGROUND OF THE INVENTION

1. Field of the Invention

The present invention relates to glass compositions based on a sol-gel process. In particular, the present invention relates to a process for making a stable, porous, tetraethyl orthosilicate-based composition, and methods for using this composition.

2. Discussion of Background

A wide variety of applications exist for compositions that include a reactive or filler compound added to a matrix material where small quantities of the additive can meet the needs of the particular application but the support of and deployment provided by the matrix is required for the effectiveness of the composition. The choice of additive is governed by its intended use. The matrix material is frequently chosen because it is non-reactive and glass, in particular, is selected for applications where transparency is important. Examples of compositions include photoreactive indicators in polymers, particles or fibers of a filler material in a carrier material used to repair cracks In ceramic or metal substrates, and hydrides incorporated into a porous glass for use in storing hydrogen.

Sol-gel processes are used to make highly porous materials. In a typical sol-gel process, a homogeneous, aqueous solution of a suitable starting material such as a metal oxide, alkoxide, alcohol, sulfide or the like, is prepared. The pH of the solution is adjusted, then the solution is hydrolyzed and blended with additives. This sol solution is polymerized and dried to yield an inert, stable and highly porous product. Sol-gel glasses can be made to have a high surface area-to-volume ratio. Advantages of sol-gel processes include low energy requirements, production of a high purity product, ability to be form a product at low temperatures, and uniform dispersion of additives into the product.

The high specific surface area of sol-gel glass impacts the amount of the additive that can be incorporated into the glassy support matrix. Sol-gels are known as supports for reagents interacting with solutes or other components. Many such uses are described, for example, in European patent application 91300458.6 (Publication No. 0 439 318 A2) filed by Avnir et at.

Our commonly-assigned and recently-filed U.S. patent applications disclose several compositions prepared by sol-gel processes. The disclosures of these applications are incorporated herein by reference. A composition for catalyzing hydrogen isotope exchange comprises a transition metal catalyst in a highly porous matrix (Ser. No. 967,653, filed Oct. 28, 1992). The starting material is an organometal of the form $M(OR)_x$, where M is a metal, O is oxygen, R is an organic ligand of the form $C_nH_{2n+1}$, and n and x are integers. A homogeneous, aqueous solution of the starting material is prepared. The pH of the solution is adjusted, the solution is hydrolyzed, and the catalyst is added. This sol solution is polymerized and dried. Hydrogen-absorbing compositions incorporate hydrides such as La, Ni, Pt, La-Ni-Pt alloys, and La-Ni-Al alloys such as $LaNi_{4.25}Al_{0.75}$ (Case No. S-76,251; Ser. No. 968,640, filed Oct. 29, 1992). Uses for the compositions include hydrogen storage and recovery, recovery of hydrogen from gas mixtures, and pumping and compressing hydrogen gas.

Optical indicators are often used for detecting the presence of an analyte of interest in an aqueous solution. The optical properties of an indicator may vary in wavelength and/or intensity as the concentration of the analyte varies. Preferably, although sensitive to the analyte, the indicator is unaffected by the fluid and other chemical species present in the fluid. A large number of optical indicators are known, offering a wide range of choices in the detection and analysis of their corresponding analytes.

Indicators are applied in several ways. For example, an indicator may be dissolved in the solution to be tested. Alternatively, a carrier such as paper can be coated with an indicator and then placed in contact with the solution to be tested. Indicators may also be incorporated into a glass or polymer matrix to form an insoluble, reusable composite. These indicators, known as bound indicators because they are in an insoluble form, are more useful for industrial and laboratory applications because they can be used repeatedly. Bound indicators are often used with flow cells or optical probes for measuring the concentration of an analyte in an aqueous medium. The indicator is placed on or directly adjacent to the surface of an optical fiber. Then interaction between the indicator and the analyte is monitored from the optical signals carried by the fiber to a detector.

Indicators are immobilized in a porous matrix by absorption, adsorption, or other methods. The matrix must be readily permeable to fie fluid so that analytes of interest can reach the indicator molecules. In general, the faster the fluid permeates the matrix, the faster the response time of the probe. The matrix must be capable of containing a sufficient amount of the indicator to provide a measurable response. The more indicator molecules contact the fluid, the greater the intensity of the optical signal. Thus, the sensitivity depends on the quantity of indicator that can be added to the matrix during manufacture.

Several devices using indicators embedded in a matrix or carrier substance are known. In U.S. Pat. No. 5,114,676, Leiner et al. disclose an optical thin-film sensor for determining one or more parameters in a liquid or gaseous sample. The sensor includes a fluorescent indicator embedded into a micro-porous glass bead. Mauze (U.S. Pat. No. 5,057,277) combines a continuous phase silicone material, a silica filler material, a luminescent radioactive material, and a modifier material that produces a desired range of radioactivity in response to ambient concentrations of a selected analyte. Yafuso discloses a permeable polymeric matrix containing fluorescent indicators (U.S. Pat. No. 4,954,318), and a gas permeable silicon polymeric matrix containing a mixture of non-polar derivatives of a polynuclear aromatic compound serving as an optical indicator (U.S. Pat. No. 4,849,172). Harper teaches a pH sensor comprising an organic indicator covalently coupled to an inorganic carrier with an organo-functional silicon agent (U.S. Pat. No. 3,904, 373).

Optical indicators are used in probes such as the spectrometry detector head described by Ring, et al. (U.S. Pat.

No. 4,917,491). The device comprises an optically-transparent chamber containing a mirror and a color-reactive indicator. The device is inserted into a flow path where the fluid of interest enters the chamber and interacts with the indicator. Costello (U.S. Pat. No. 4,682,895) provides a fiber optic probe for quantification of colorimetric reactions. The probe includes a sample chamber having an opening covered by a semipermeable membrane. The chamber contains a colorimetric substance made by introducing a dye into a porous support medium, such as small glass microspheres mixed with water. The membrane holds in the glass particles of the support medium while allowing water to flow through the membrane. Saaski, et al. (U.S. Pat. No. 5,039,491) shows a miniature cell with an indicator affixed to a reflective wall. Hansen, et al. (U.S. Pat. No. 4,973,561) position an insoluble solid indicator material against one wall of a flow cell. Light is directed by an optical cable through the flow cell and the material and is reflected back to the cable and a detector.

Presently-available indicator compositions—and devices using such compositions—have limited sensitivities and slow response times. Fluorescent indicators, for example, are typically embedded in a polymer matrix that is penetrated only slowly by the sample fluid. Furthermore, polymer-based compositions are not suitable for use in high radiation fields or in corrosive environments. A satisfactory indicator composition should be sensitive to low concentrations of the analyte of interest, have a short response time, long-term stability and reproducibility, and be chemically inert in radiation fields and other severe operating environments.

In addition to serving as a matrix for indicators and other compounds, glass compositions can be applied as coatings for repair or prevention of damage to the coated surface. Substrates such as the surfaces of piping and vessels of metal, glass, ceramics, masonry, for example, are prone to develop cracks or become cracked from a variety of causes. Intergranular stress corrosion cracking and helium embrittlement are two such causes of cracking in metal substrates; welding operations and metal fatigue are two others. Cracks in metal or other piping materials or vessel walls used for transporting or containing liquids and gasses can leak, especially if the contents of the pipe or vessel are under pressure. Glass windshields develop cracks from stones thrown by tires of other vehicles; and shifting foundations produce cracks in masonry such as cinderblocks.

Repairing a cracked substrate, especially in situ, is often more economical than replacing it, and more importantly, may allow vital operations to continue until the next scheduled shutdown. Repairs may be carried out by filling, patching, or coating cracks and other defects in the substrate, or both filling and coating. It is important that such a filling or coating material stop leaks. The material should adhere to the substrate to produce a structurally-sound repair. It is also important that the material be reasonably inert to chemical attack and generally fire retardant. For nuclear applications, the material should be resistant to ionizing radiation. The material should be easy to apply, especially in an environment that is harmful to the health and safety of workers where the repairing must be done simply, quickly, and/or by remote means.

There are a variety of applications for a sol-gel-based composition that can incorporate a wide range of additives, with the choice of additive depending on the desired properties of the composition and its intended use. The composition should be easily prepared, chemically inert, and stable in the operating environment.

SUMMARY OF THE INVENTION

According to its major aspects and broadly stated, the present invention is a stable, tetraethyl orthosilicate-based composition prepared by a sol-gel process having a wide variety of applications. The composition is made by preparing a pH-adjusted mixture of ethanol, water, and tetraethyl orthosilicate, and aging the mixture at room temperature. An additive is then blended into the aged mixture, forming a slurry.

In one embodiment, the additive is an indicator for a specific analyte, such as an absorbance or fluorescence indicator for hydrogen ions (pH) or other ions of interest. In an alternative embodiment, the additive is metal particles when the composition is for use in repairing cracks and other defects in conduits and vessels such as those made of metal, glass, or ceramic. The slurry is applied to the substrate, polymerized, and dried. The composition prevents the cracks from leaking.

An important feature of the present invention is the glass matrix. The matrix is made by a sol-gel process, using tetraethyl orthosilicate as the starting material. The matrix can be made by the present process in air, at low temperatures and at atmospheric pressure. The properties of the matrix can be varied as needed by changing the relative proportions of water, ethanol, and tetraethyl orthosilicate, the pH, and the conditions under which the process steps are carried out. The final product is a composition having a uniformly dispersed additive in an inert, stable and porous matrix, with a large number of sites available for binding the additive and a great flexibility in accommodating additives for many different purposes.

Another important feature of the present invention is the combination of the additive and the matrix. The sol-gel matrix has the ability to incorporate indicators at low temperatures into solid products. This allows the use of organic indicators and other indicators that could be adversely affected if high temperatures are used. The effectiveness of the additive is much greater when dispersed in a porous matrix, especially one inert to the environment of use. Consequently, less additive is needed. If the additive is an indicator for use in spectrometric analysis, the interaction between the indicator and the analyte is more efficient.

The additive may be an optical indicator for a specific analyte, such as an absorbance indicator for hydrogen ions (pH) or other ions of interest, in an amount up to approximately 40 wt. % of the dry gel. The resulting indicator composition is responsive to the presence and concentration of that analyte and can be applied to a substrate such as a window of a flow cell, a lens, or the end of an optical fiber, to produce an environmentally stable, re-usable detector. The composition is porous and chemically durable, so the analyte of interest can enter the matrix and effectively react with the indicator, while the indicator itself remains trapped within the matrix. With an appropriate choice of indicator, the composition can be tailored to measure pH, or detect and measure other analytes such as organics (gasoline, benzene, trichloroethylene, toluene, xylene, and so forth), heavy metal contaminants (Hg, Cd, U, Pb, and so forth), and pesticides. Indicators usable with the present invention include those that are compatible with the sol-gel matrix and responsive to the analyte of interest, including but not limited to pH, redox, metallochromic, and adsorption indicators.

Alternatively, the additive may consist of metal particles such as alumina, as a filler material that can be used to repair cracks and other defects in metal, glass, masonry or ceramic structures such as conduits and vessels. The material chemically adheres to the structure and can fill cracks ranging in size from very small stress corrosion cracks to much larger cracks and holes or other voids. The additive can range from submicron size, preferably down to 0.01 microns, up to approximately 200 microns. Submicron particles are preferred for use in repairing fine cracks; larger sizes are more useful in repairing larger cracks or other defects. A wide range or distribution of particle sizes, rather than a narrow range of particle sizes, is preferred for large cracks.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3a is an exploded perspective view of a flow cell having windows coated with the indicator composition;

FIG. 3b shows the flow cell of FIG. 3a in an optically-transparent housing;

FIG. 6 shows a flow cell body according to another embodiment of the present invention;

FIG. 7 shows an alternative flow cell body;

DETAILED DESCRIPTION OF A PREFERRED EMBODIMENT

Figure 1:
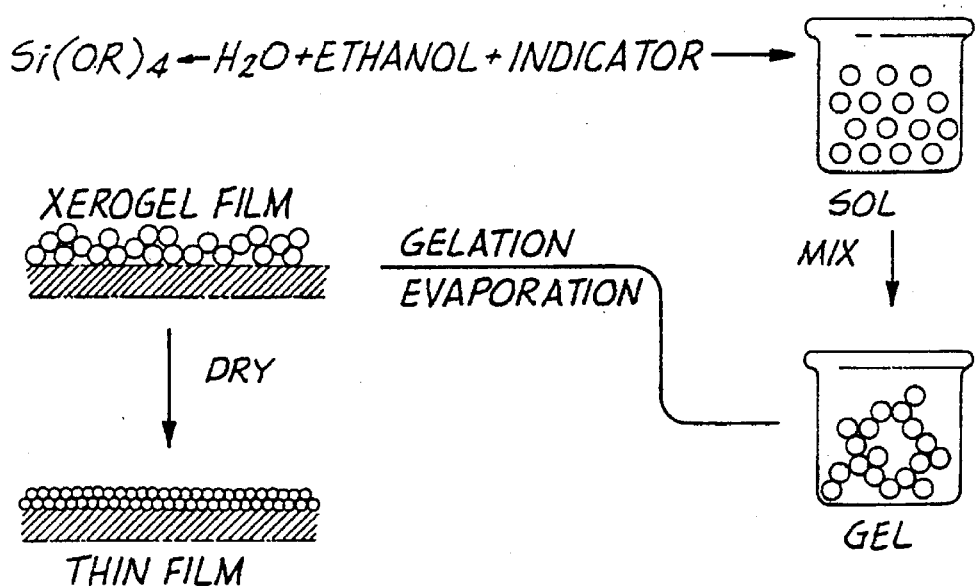
FIG. 1 is a schematic representation of a process for preparing a substrate coated with an indicator composition according to a preferred embodiment of the present invention.

The present invention is the combination of a porous glass matrix made in accordance with a specific sol-gel process and an additive dispersed throughout the matrix. The additive is selected for the particular application but may be an indicator, a filler or a catalyst. According to a preferred embodiment of the present invention, a composition comprising the glass matrix and the additive is prepared by a process generally as follows. The matrix is prepared from a pH-adjusted mixture of ethanol, water, and tetraethyl orthosilicate. The mixture is hydrolyzed and blended with an additive to form a slurry. The slurry is polymerized and dried to yield an inert, stable and highly porous product. Advantages of sol-gel processes include low energy requirements, ability to produce a solid product at low temperatures, production of a high purity product, and uniform dispersion of additives into the product. In addition, glass is stable and extremely durable, even when exposed to high radiation fields, organics, corrosive environments, and other severe operating conditions.

The choice of additive depends on the anticipated use of the composition and its desired properties. The additive may be an indicator for a specific analyte, such as an absorbance or fluorescence indicator for hydrogen ions (pH) or other ions of interest. Then, the product is an indicator composition that is responsive to the presence and concentration of that analyte in an aqueous fluid contacting the composition. The indicator composition is applied to a durable substrate to form an environmentally stable, re-usable detector. The additive may consist of crystalline metal particles, resulting in a filler material that can be used to repair cracks and other defects in structures such as conduits and vessels made of metal, glass, or ceramic. The material chemically adheres to the structure and can fill cracks ranging in size from very small stress corrosion cracks to much larger cracks and holes or other voids. If desired, the additive may be particles of a metal hydride such as La, Ni, Pt, the La-Ni-Pt alloys, or the La-Ni-Al alloys such as $LaNi_{4.25}Al_{0.75}$, as disclosed in our commonly-assigned application (Case No. S-76,251). The resulting composition has pores large enough to allow hydrogen-containing gases to pass through the matrix, yet small enough to hold the hydride particles dispersed within the matrix so that the hydrogen-absorbing particles are not released during repeated hydrogen absorption/desorption cycles.

The composition is prepared as follows:

1. Add ethanol to water and stir to form a first mixture. Continue stirring until the mixture is thoroughly blended, preferably for several minutes or longer.

The ratio of ethanol to water in the mixture may vary widely, but is preferably in the range of approximately two to five parts of ethanol to one part of water. The ratio is chosen in view of the desired properties of the final product. Thus, the higher the ethanol-to-water ratio of the mixture, the more uniform the final product; and the lower this ratio, the stronger and more granular the product. The ethanol is mixed with water to facilitate the subsequent mixing of tetraethyl orthosilicate therein (step 4). Ethanol also affects the viscosity, evaporation rate and cure time of the sol, as will be discussed further below.

Ethanol is generally preferred because It dissolves a wide range of additives, especially many known organic indicators. However, other low molecular weight alcohols may be used if desired, including but not limited to methanol, 2-propanol, butanol and isobutanol, alone or in combination. Combinations of alcohols may be used to obtain substantially the same evaporation rates and curing times as when ethanol is used. Where desired, different curing times may be obtained by slowing evaporation rates and dilution of the silica moieties.

2. Adjust the pH of the first mixture to the acid side (pH<7) by adding hydrochloric acid (HCl), preferably into the range of about 0.5 to 5, and most preferably into the range of about 0.5 to 3.0.

Hydrochloric acid is preferred, however, other mineral acids such as sulfuric acid, nitric acid or phosphoric acid, or low molecular weight organic acids such as formic, acetic and propionic acids may be used if desired.

3. Separately prepare a second mixture by mixing ethanol and tetraethyl orthosilicate $(Si(OC_2H_5)_4)$. The ratio of ethanol to tetraethyl orthosilicate can vary over a wide range, but is preferably approximately one part ethanol to two parts tetraethyl orthosilicate. The preferred alcohol is ethanol, however, other alcohols such as those noted in step 1 may be used if desired. Similarly, other metallo-organic compounds, including but not limited to the metal alkoxides, may be used to prepare the second mixture. The alcohol is used as a solvent to facilitate the thorough mixing of tetraethyl orthosilicate with water (step 4). It will be understood that the optimum admixture of alcohol depends on the particular choice of metallo-organic compound and the desired properties of the final product.

4. Add the first mixture to the second and mix thoroughly to form a third mixture. The ratio of the first to the second mixtures can vary over a wide range, but is preferably approximately one part of the first mixture to two parts of the second mixture. The pH of the third mixture is preferably on the acid side, most preferably in the approximate range of about 0.5 to 3.0.

It is well known in the art that the pH, water content, alcohol content, and temperature of the mixture affect the properties of the resulting glass product, including its density, porosity, and specific surface area. Thus, pH and water content affect the rate and degree of cross-linking of the tetraethyl orthosilicate molecules to form oligomers. This degree of cross-linking affects the pore size, pore volume, hardness and other qualities of the glass matrix. The ethanol content affects the evaporation rate and cure time of the sol, but has its greatest effect in controlling the viscosity of the composition. Where the composition is applied to a substrate as a film, the viscosity plays a large role in determining attainable film thicknesses and, therefore, the adherence and mechanical integrity of the film on the substrate. Thinner films are more resistant to cracking and spalling during drying. The optimum conditions for producing a composition with the desired properties are therefore best determined by observation and a modest degree of experimentation for each particular additive.

5. If desired, lower the density of the third mixture by adding a foaming agent. Suitable foaming agents include alkali metal soaps, metal soaps, quaternary ammonium compounds, detergents, alkali metal phosphates, and amino compounds. Foaming agents and other additives such as surfactants, detergents, and so forth, may be added if desired.

6. Cover tightly and age for several hours at room temperature. Aging allows the desired gelation of the sol-gel matrix to take place. The strength of the final product correlates with aging times. Although as little as a few minutes may suffice, the desired aging time is at least approximately 24 hours. In order to avoid premature curing of the third mixture, aging is preferably carried out in the absence of air and with substantially original dilution maintained.

7. When the third mixture has been aged sufficiently, add the desired additive and mix thoroughly to form a slurry. The type and amount of the additive depends on the desired properties and use of the final product. Some routine experimentation may be required to determine the most appropriate viscosity or solids-loading of the slurry for each particular application. The resulting composition may be cured in a suitable container and machined into the desired size and shape for use. If desired, the composition can be fabricated in the form of pellets, discs, or other shapes dimensioned to the anticipated use. Alternatively, the composition may be applied to a substrate before curing. The composition will cure at room temperature or at elevated temperatures. When cured at higher temperatures, the composition will densify to a higher degree. To avoid possible degradation of organic additives, the temperature should be less than the melting or decomposition point of the additive.

The following representative examples illustrate preparation and use of the composition using particular additives.

I. Indicator Composition

An indicator composition according to the present invention comprises a porous matrix incorporating at least one indicator, prepared generally as described above. As used herein, the term "indicator" means a substance which changes color in the presence of an analyte of interest.

Preparation of the composition is illustrated schematically in FIG. 1, where the letter "R" represents an organic substituent such as $C_2H_5$. The sol is prepared and aged as described in steps 1–6 above. The pH, water content and ethanol content of the third mixture are determined in view of the desired properties of the glass matrix. If desired, a gelling agent such as hydrogen fluoride (HF) may be added to the mixture to initiate more rapid condensation and formation of solid materials. Other constituents such as drying control chemical additives well known in the art may be added to control the pore size of the product. The pore size is an important factor in determining whether the indicator composition has an adequate response to the analyte of interest, that is, whether the analyte can contact the indicator to elicit a measurable response. The overall effect of such additives on the product should be carefully evaluated. For example, glycerin, a common additive, increases the pore size but degrades the mechanical integrity or hardness of the product.

Add the indicator (or indicators) as described in step 7. The indicators are preferably added directly to the sol, without prior dissolution in solvents. The response time and sensitivity of the composition is proportional to the available surface area of the indicator. The indicator is preferably in the form of a fine powder having particles less than approximately 100 µm in size to facilitate dispersion and dissolution in the liquid mixture. The indicator is preferably added in an amount of up to 40 wt. % of the dry gel. Indicator loading is adjusted such that the color intensity is at the optimum value for the measurement. If desired, the sol may be stored for extended periods after mixing but prior to coating optical surfaces.

To prepare the composition for use, proceed as follows:

1. Apply the composition to a suitable substrate, for example, by spraying, painting, or spreading the composition onto the substrate, dipping the substrate into the composition, or any other convenient technique, depending on the consistency of the composition. A thinner composition will, of course, form a thinner layer than a thicker composition will.

2. Allow the composition to polymerize, forming a gel that contains the polymerized material and a liquid as two continuous phases (FIG. 1). Polymerization is preferably carried out in air at atmospheric pressure.

The time required for substantially complete polymerization varies from a few minutes to several days, depending on such factors as the temperature, pressure, atmosphere, pH, the materials used to produce the composition, and so forth. For example, lower temperatures typically slow down the polymerization reaction and may be desirable to prevent overly abrupt polymerization. Temperatures that are lower than the melting or decomposition point of the indicator are preferred, since higher temperatures may effect the chemical and structural integrity, and therefore the effectiveness, of many organic indicator molecules. The optimum conditions for polymerization are best determined by experimentation for each particular combination of materials in view of the desired properties of the composition.

3. Evaporate the gel to remove the liquid phase and especially absorbed water, forming a porous xerogel film (FIG. 1).

4. Dry the xerogel film to produce a thin film incorporating the indicator in a durable silica glass matrix (FIG. 1). Evaporation and drying are preferably carried out at elevated temperature and atmospheric pressure. The temperature, pressure and humidity conditions under which the gel is dried affect the porosity and mechanical integrity of the final product. The film may shrink or even fracture if dried too quickly. Drying under controlled conditions allows the water and alcohol in the gel to evaporate at a rate that depends on the controlled vapor pressure, avoiding damage to the structural integrity of the composition.

Sol-gel chemistry allows incorporation of sensitive organic indicators into a porous glass matrix at low temperatures, so the effectiveness of the indicators is not adversely affected as in a high-temperatures process. This allows the use of organic indicators and other indicators that could be adversely affected by high-temperature processes. The resulting composition is both chemically durable and porous, so the analyte of interest can enter the matrix and effectively react with the indicator, while the indicator itself remains trapped within the matrix. With an appropriate choice of additive, the composition can be tailored to measure hydrogen ion concentration (pH), or detect and measure other analytes such as organics (gasoline, benzene, trichloroethylene, toluene, xylene, and so forth), heavy metal contaminants (Hg, Cd, U, Pb, and so forth), and pesticides.

Indicators usable with the present invention include those that are compatible with the sol-gel matrix and responsive to the analyte of interest, including but not limited to pH, redox, metallochromic, and adsorption indicators. Hydrogen ion (pH) indicators are also useful in measuring the concentrations of substances that affect the pH of a solution. For example, the pH of blood depends on dissolved bicarbonate, oxygen and carbon dioxide concentrations. With spectrophotometric analysis and appropriate chemometric modeling, indicators may be used beyond their visual response range.

A wide variety of indicators are known, including many redox indicators and several hundred pH and metallochromic indicators. The optical characteristics of these indicators change in the presence or absence of a selected analyte. Lists of indicators are provided in references such as the *CRC Handbook of Chemistry and Physics*, most recent edition.

Known hydrogen ion indicators span a wide range of the pH scale, allowing pH measurements to be made even at extreme values where pH meters are ineffective. Indicators with transitions in the visible wavelength range are available in several large classes based on chemical structure: sulphonephthaleins such as bromophenol blue, azo dyes, nitro indicators, phthaleins, analinesulphone phthaleins, and others. Suitable pH indicators for use with the present invention include bromophenol blue, methyl violet, crystal violet, ethyl violet, malachite green, 2-(p-dimethylaminophenylazo)pyridine, cresol red, methyl green, quinaldine red, paramethyl red, metanil yellow, thymol blue, metacresol purple, orange IV, erythrosine, 2,4-dinitrophenol, congo red, methyl orange, ethyl orange, bromocresol green, resazurin, ethyl red, alizarin red S, methyl red, propyl red, bromocresol purple, chlorophenol red, alizarin, phenol red, neutral red, m-nitrophenol, curcumin, metacresol purple, o-cresoophthalein, p-naphtholbenzene, phenolphthalein, thymolphthalein, alizarin yellow R, and others.

Metallochromic Indicators, which allow sensitive measurement of metals and metal ions, are typically used for chelometric titrations. These indicators change color when complexed with various metals or metal ions. Most metallochromic indicators respond to more than one metal; several respond to all the rare earth elements. Porphyrin compounds are also available for use as metal indicators. These compounds have a more specific response to analytes such as Hg or Cd, and their structure may be tailored to the metal ion of interest.

Adsorption indicators that respond to anions (Cl—, $SO_4^{2-}$, SCN—, and so forth) are available. These indicators require the presence of metallic counter-ions that form insoluble complexes. The indicators respond to the insoluble complex, that is, adsorb on the surface of the complex and change color, during precipitation. Such adsorption indicators are usable in the indicator composition if the required metal counter-ion is present in the composition.

Fluorescent indicators exhibit changes in fluorescence in response to changes in pH. Suitable fluorescent indicators for use with this invention include, but are not limited to, benzoflavine, erythrosine (pH=0–2); fluorescein (pH=2–4); acridine, resorufin (pH=4–6); acid R phosphine, coumaric acid (pH=6–8); acridine orange (pH=8–10); coumarin, cosine BN (pH=10–12); cotarnine (pH=12–14).

Other fluorescent indicators are sensitive to the oxidation-reduction potential of a solution. Suitable redox indicators for use with the present invention include, but are not limited to, diphenylbenzidine, methylene blue, diphenylamine, trianylmethane, triazinyl, and so forth. Adsorption indicators for monitoring the concentrations of specific ions include fluorescein, diiodofluorescein, dichlorofluorescein, phenosafranin, rose bengal, eosin, tartrazine, and others. A composition for a wider pH range than can be covered by any one indicator may be desirable for some applications. In such cases, the composition may include two or more indicators, each indicator covering a separate pH range so that the combination of indicators covers the desired range. Other applications may require detecting a plurality of different chemical species. Here also, a plurality of suitable indicators may be incorporated into a single composition. Alternatively, different compositions, each incorporating an indicator for a different species, may be used. Different types of indicators may be combined in a single composition to produce "universal probes" designed for multiple uses.

The indicator composition is applied to a substrate such as a flow cell, lens, optical fiber, or indicator strip for use. The composition can be coated onto a variety of substrates, including glass, plastic, fiberglass, paper, cloth, and wood. The coating is thin, stable, radiation-resistant, relatively inert to chemical attack and fire-retardant. Due to the porosity of the glass matrix, the analyte to be measured can readily migrate into the composition and react with the trapped indicator.

Prior to coating with the composition, it is recommended that the surface of the substrate be prepared by one or more of several standard techniques. Surface preparation may include etching with HF, solvent washing, detergent washing, and combinations thereof. For example, glass surfaces may be detergent-washed and rinsed several times with deionized water to remove all initial surface oils prior to further surface treatment. Solvent washing and HF etching for approximately 30 to 90 seconds improve the ability of a glass surface to retain thin coatings of the composition.

The following examples illustrate a composition incorporating a pH indicator.

EXAMPLE 1

For a test of the effectiveness and durability of the composition, glass slides were coated with several compositions containing bromophenol blue (BPB), an indicator that changes color from yellow (acidic) to blue (basic) over the pH range of approximately 3 to 7. The pH of the compositions was adjusted to 2.2 (sol-gel preparation step 2 above); the water:tetraethylorthosilicate ratio ($H_2O$:TEOS) was 2 or 20. The compositions contained approximately 0.002 g/ml BPB. The compositions varied in drying time and temperature, with drying times ranging from 15 minutes to 120 hours and drying temperatures ranging from room temperature (about 20° C.) to 120° C. The coated slides were placed into buffered solutions of known pH and color changes were observed. Leachate testing of the coated slides was conducted in solutions having pH values of 2 and 10. Test results are listed in Table 1.

TABLE 1

Leachate and response time tests of BPB indicator composition. Leachate testing was conducted in solutions having pH values of 2 and 10. Qualitative durability ratings were based on indicator leached into the solution and are as follows: A = Excellent (no or slow leaching, i.e., durable for >5 days), B = Good (moderate leaching, durable for 1–5 days) and C = Poor (fast leaching, durable for <1 day). Response time indicates how quickly the color changes occurred: F = Fast (<10 sec), M = Moderate (10–60 sec), and S = Slow (>60 sec). R.T. = room temperature (approximately 20° C.).

| $H_2O$:TEOS | Drying Conditions | | Durability | | Visible | |
| --- | --- | --- | --- | --- | --- | --- |
| Response Ratio | Temp. (°C.) | Time (Hrs.) | Solution pH | | Color Change | Time |
| | | | 2 | 10 | | |
| 2 | R.T. | 0.25 | A | C | yes | F |
| 2 | R.T. | 2 | A | C | yes | F |
| 2 | R.T. | 8 | A | C | yes | F |
| 2 | R.T. | 24 | A | C+ | yes | F |
| 2 | R.T. | 120 | A | C+ | yes | F |
| 20 | R.T. | 0.25 | A | C | yes | F |
| 20 | R.T. | 2 | A | C | yes | F |
| 20 | R.T. | 8 | A | C+ | yes | F |
| 20 | R.T. | 24 | A | C+ | yes | F |
| 20 | R.T. | 120 | A | B | yes | F |
| 2 | 60 | 0.25 | A | C+ | yes | F |
| 2 | 60 | 2 | A | B | yes | F |
| 2 | 60 | 8 | A | A | yes | F |
| 20 | 60 | 0.25 | A | B | yes | F |
| 20 | 60 | 2 | A | B | yes | F |
| 20 | 60 | 8 | A | A | yes | M |
| 2 | 120 | 0.25 | A | A | yes | M |
| 2 | 120 | 1 | A | A | yes | S |
| 2 | 120 | 2 | A | A | yes | S |
| 20 | 120 | 0.25 | A | A | yes | M |
| 20 | 120 | 1 | A | A | yes | S |
| 20 | 120 | 2 | A | A | yes | S |

Figure 2:
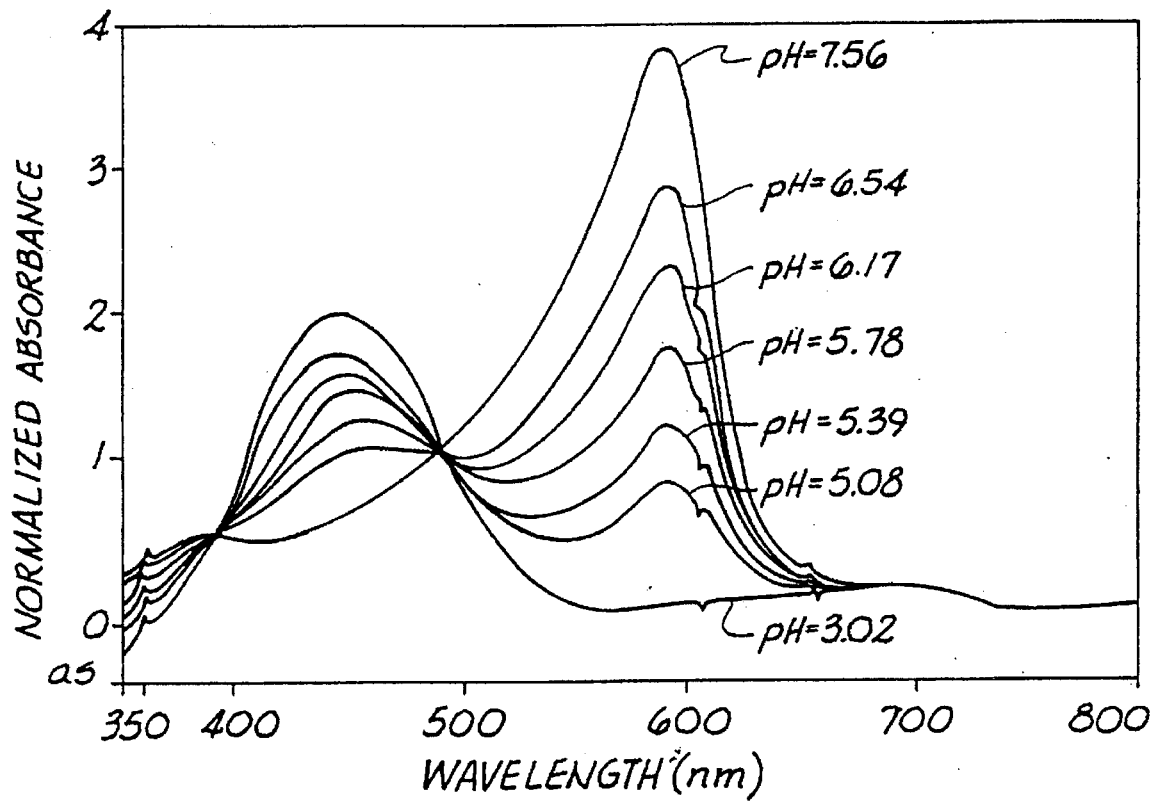
FIG. 2 is a graph of the normalized absorbance as a function of wavelength at differing pH values of the indicator composition of FIG. 1.

Color changes were reversible and readily apparent to the naked eye in the range of pH 3.5 to 6.5. The slides were also examined by spectroscopy to study pH-related changes in the absorbance spectrum of the indicator composition. Curves of the absorbance spectrum (normalized with respect to absorbance at 492 nm) versus wavelength for pH values ranging from 3.02 to 7.56 are shown in FIG. 2.

All slides exhibited excellent leach resistance at pH=2. Leach resistance at pH=10 varied. As seen from the results in Table 1, the longer the drying time and the higher the drying temperature of the composition, the better the leach resistance at pH=10. Compositions with an $H_2O$:TEOS ratio of 20 had better leach resistance than compositions with a ratio of 2 when dried at room temperature or 60° C. However, compositions having shorter drying times and lower drying temperatures had faster response times to changes in pH. Thus, the optimum drying time, temperature and $H_2O$:TEOS ratio are best determined by a modest degree of experimentation and observation for each particular formulation.

EXAMPLE 2

In conventional flow injection analysis (FIA), a discrete sample volume ("plug") is introduced into a carrier stream and transported through a flow cell. In less complicated FIA systems the carrier stream is also the indicator solution. As the sample "plug" transports through the conduit of the system, it mixes and reacts with the indicator solution, generating a colored reaction product. Subsequently the absorbance, in the specified wavelength range, of the colored product is measured spectrophotometrically as it passes through the flow cell. The system is calibrated by measuring known standard solutions by the same process as described above, then using these standard values in comparison so unknown samples. Since the samples are mixed with a reagent, they must be disposed of after the measurement. Waste disposal considerations are especially important if radioactive or hazardous materials are involved. This technology minimizes the waste created significantly compared to other conventional measuring techniques.

In most FIA systems, samples are fed to the flow cell through coiled tubing having a fixed diameter. The volume of a sample plug is controlled by varying the sample flow rate and the "length" of the sample admitted to the flow cell. The samples may be part of a series of discrete samples, or continuous samples from a process stream. If desired, samples can be diluted, concentrated, filtered, or chemically modified before introduction into the flow cell. The sensitivity of measurement can be controlled by sample dilution or by prolongation of the reaction time through stopped-flow techniques, i.e. by holding to the sample in the flow cell for a prolonged, but well-defined time period.

Referring now to FIG. 3a, there is shown an exploded view of a flow cell incorporating an indicator composition according to a preferred embodiment of the present invention. Flow cell 10 includes cell body 12, windows 14, 16, and opposing recesses 18, 20. Fluid inlet 22 and outlet 24 are in fluid connection with sample chamber 26, which extends through body 12.

Windows 14, 16 are dimensioned to fit into recesses 18, 20, respectively. Windows 14, 16 have outer sides 28, 30 facing away from cell body 12, and inner sides 32, 34 facing cell body 12. Inner sides 32, 34 are coated with layers 36, 38, respectively, of an indicator composition prepared as described above. When windows 14, 16 are fitted to recesses 18, 20, layers 36, 38 abut opposing ends of sample chamber 26.

The combination of cell body 12 with windows 14, 16 in recesses 18, 20 is placed into optically transparent housing 40 (FIG. 3b). Tubing 42, 44 is fitted to fluid inlet 22 and fluid outlet 24, respectively, and fixed with a suitable flexible sealant or potting compound.

Cell body 12 is made of an inert material such as glass, Plexiglass, Teflon™, or Kevlar™. Windows 14, 16 and housing 40 are optically transparent in the wavelength range of interest, preferably made of glass, Plexiglass, or quartz. Tubing 42, 44 is any suitable inert, flexible tubing.

Coatings 36, 38 are formed by applying an indicator composition as described above to windows 14, 16. Alternatively, an indicator material incorporated into some other chemically inert, porous matrix such as a porous polymer, may serve for coatings 36, 38. Windows 14, 16 are removable and replaceable, enabling cell 10 to be readily removed from housing 40 and provided with different windows coated with a different indicator. If desired, however, windows 14, 16 may be cemented into recesses 18, 20, and cell 10 used without housing 40.

In use, the sample plug is directed through inlet 22 into sample chamber 26 and exits the sample chamber through outlet 24. While in chamber 26, the sample fluid interacts with coatings 36, 38 of windows 14, 16, thereby changing the optical characteristics of the coatings. Light is directed through sample chamber 26, as indicated generally by arrows 46 (FIG. 3b). Sample-induced changes in the optical properties of coatings 36, 38 are measurable as changes in the amount of light transmitted through cell 10 and housing 40.

By way of example, a flow cell having windows coated with the indicator composition described in Example 1 above was prepared. The cell was dimensioned to fit within a standard 1 cm$^2$ cuvette. Thus, the cell measured approximately 3 cm high with a 1 cm$^2$ cross-section. Sample chamber 26 had a volume of approximately 1 cm$^3$, and tubing 42, 44 an inside diameter of about 1 mm. When the cell was assembled as shown in FIG. 3b, approximately 0.5 cm$^2$ of the indicator composition was exposed to the fluid in sample chamber 26. The device exhibited rapid and reversible color changes in response to changes in the pH of the test solution, as measured both qualitatively and quantitatively.

Figure 4:
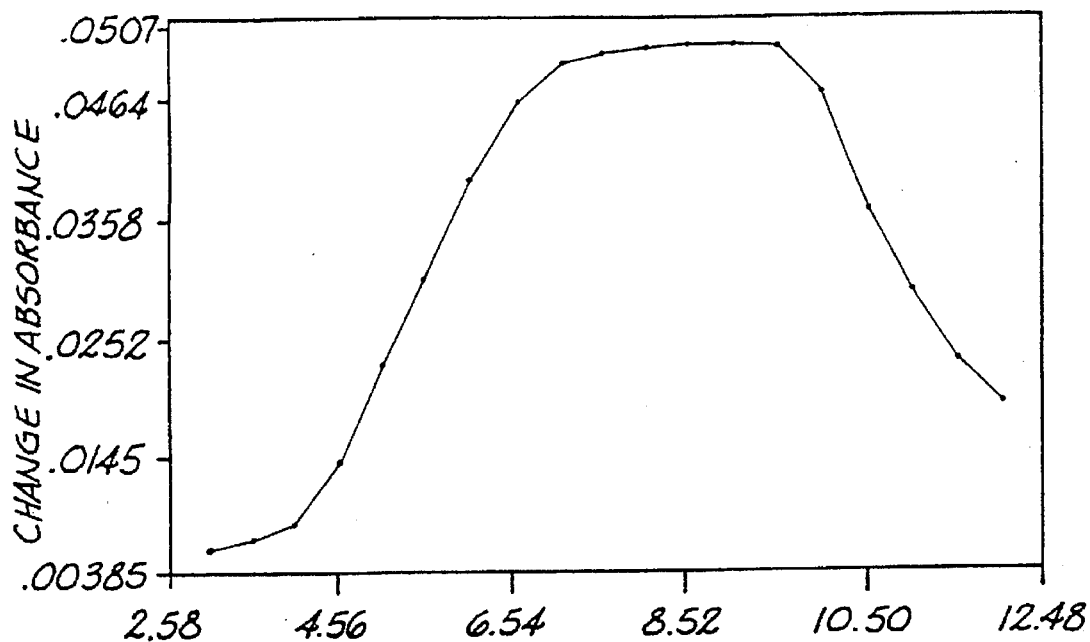
FIG. 4 is a graph of the change in absorbance versus pH for the flow cell of FIG. 3b.
Figure 5:
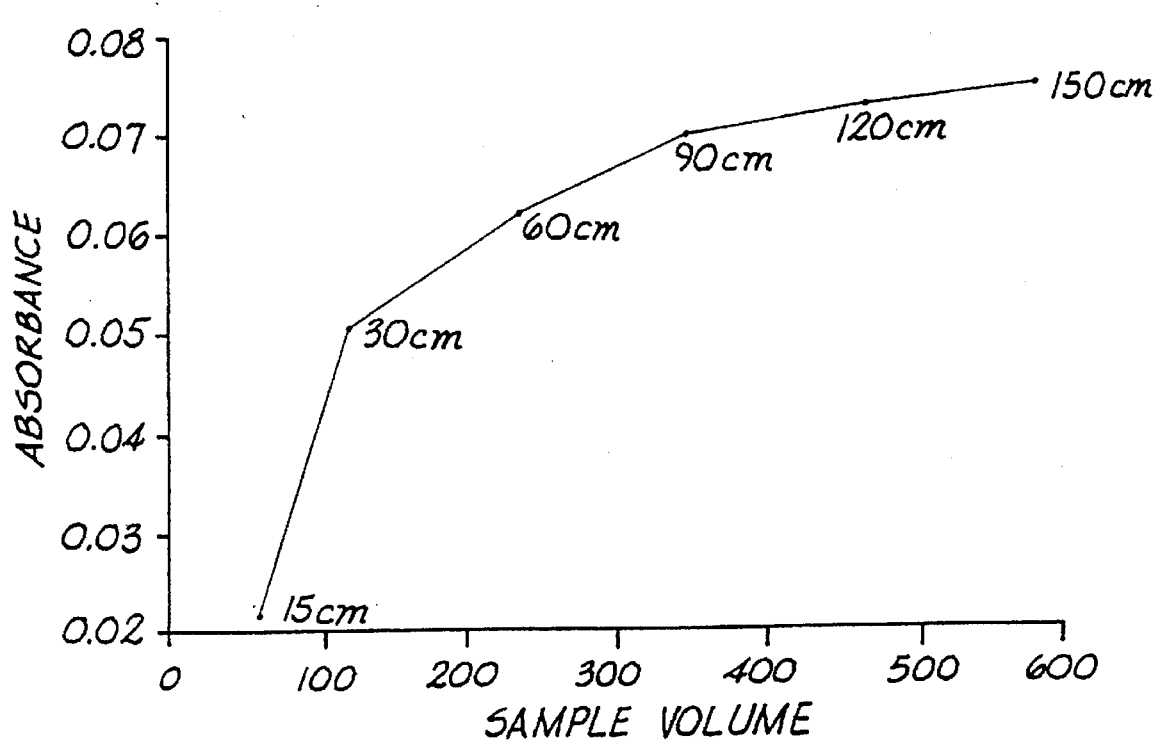
FIG. 5 is a graph of the absorbance versus sample volume for the flow cell of FIG. 3b.

The flow cell was tested with standard solutions having pH values ranging from 3 to 12. The change in absorbance with pH is shown in FIG. 4. The response was approximately linear between pH=3 and pH=7, corresponding to the linear response range of BPB. The measured absorbance values depended on the volume of the sample that was admitted to the cell (FIG. 5). As the sample volume increased, the time the sample was in the cell and therefore the time the sample was in contact with indicator-coated windows 14, 16, also increased, leading to increased absorbance. This effect became less pronounced as the sample volume increased. For the tested cell, absorbance was essentially independent for sample volumes greater than about 350 µl, corresponding to sample "lengths" of about 90 cm. The optimum sample volume depends on the characteristics of the particular system, including the dimensions of the flow cell, the fluid contact area of windows 14, 16, the diameter of tubing 42, 44, and such other factors as will be evident to one of ordinary skill.

A flow cell according to the present invention may assume the form shown in FIG. 6. Cell body 60 has central bore 62 and opposing recesses 64, 66. Recesses 64, 66 have inner surfaces 68, 70. Diameter 72 of bore 62 and depth 74 of recesses 64, 65 are such that bore 62 abuts surfaces 68, 70, forming openings 76, 78 therein. Body 60 is provided with windows 14, 16 and a housing 40 as illustrated in FIG. 3b for cell body 12. Then, fluid flows through bore 62, while light is directed through body 60 in a direction generally transverse to the direction of fluid flow. Alternatively, cell body 90 has bore 92 therethrough, coated with the composition as described above (FIG. 7). Light is transmitted directly through flow cell 10 (or flow cells 60 or 90), as when the cell is placed into a spectrophotometer for FIA studies. Alternatively, light may be directed to a cell by an optical fiber, and transmitted light carried to a remote-located spectrophotometer or other detector for analysis.

Figure 8:
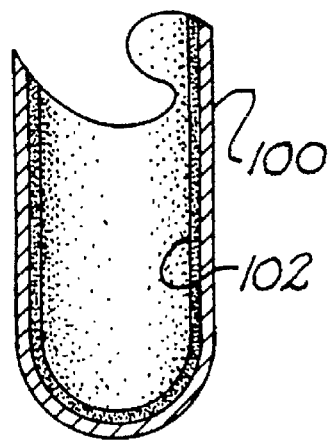
FIG. 8 shows a test tube having an interior coated with the indicator composition.
Figure 9:
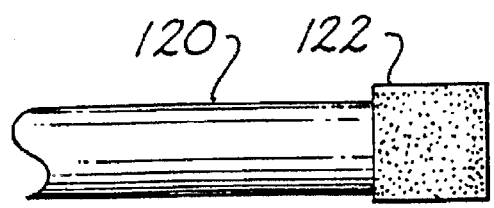
FIG. 9 shows an optical fiber coated with the indicator composition.
Figure 10:
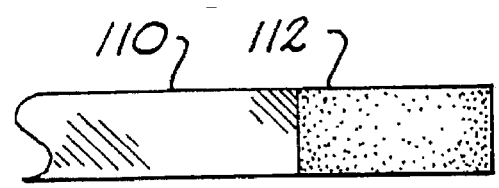
FIG. 10 shows a reagant strip coated with the composition.
Figure 11:
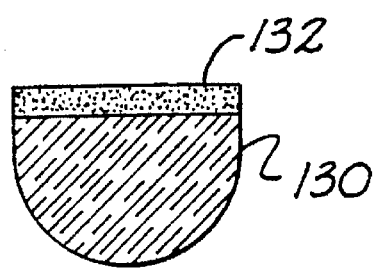
FIG. 11 shows a lens having one side coated with the composition.

An indicator composition according to the present invention can also be used to coat a test tube, a reagant strip, an optical fiber, a lens, and so forth. For example, the inside of test tube 100 is provided with a coating 102 of the composition (FIG. 8), reagant strip 110 has coating 112 (FIG. 9), and the tip of optical fiber 120 has surface coating 122 (FIG. 10). Lens 130 may have coating 132 of the composition on a face thereof (FIG. 11).

The optical properties of coatings 102, 112, 122, and 132 change when contacted with the sample fluid, thereby allowing measurement of an analyte or condition of interest. Light from a source passes through the coating and is directed towards a detector. The light may be carried by an optical fiber or may be directed across a space, such as is commonly found in a spectrophotometer.

As will be evident, the coating can be of various sizes and configurations, including the thin film generally as described and illustrated herein. Once adhered to a suitable substrate, the composition may be used repeatedly. When used to analyze radioactive or other hazardous materials, a flow cell or other device incorporating an indicator composition minimizes the waste disposal problems encountered with other systems. Only small quantities of the solution to be monitored are needed, and even those small quantities can be simply returned to the source after the measurement.

II. Filler Material

A filler material according to the present invention comprises a finely ground crystalline material such as alumina in the porous matrix. The material is used for repairing cracks in the surfaces of piping and walls of glass, ceramic, masonry or metal structures or vessels used in industrial processes, construction, or consumer products.

After preparing and aging the sol as described in steps 1–6 above, the finely-ground crystalline material is added to form a slurry. The material is preferably alumina, but other crystalline materials such as zirconium, cesium, lead and silicon can also be used. The particulate additive can range in size from as small as 0.01 microns up to 200 microns. Submicron particle sizes are preferred for use in repairing fine cracks; larger sizes are more useful in repairing large cracks. However, a broad range or distribution of particle sizes, rather than a narrow range, including submicron and slightly larger particles, is preferred for larger cracks and holes.

The amount of the additive depends on the size of the crack to be repaired because the amount of additive relates to the viscosity of the sol. For large cracks, a thicker consistency or greater viscosity is easier to apply and forms a better seal; for fine cracks and when used as a coating, a thinner consistency is preferred. Generally speaking, the viscosity can vary from that of a sprayable liquid or slurry to a thick but spreadable paste. Approximately six grams of particles per 15 milliliters (0.4 g/ml) of the third mixture forms a suitable composition to be applied to a small crack. Mixtures containing as much as 12 grams of particles per 15 milliliters (0.8 g/ml) of the third mixture have been used satisfactorily for repairing larger defects.

The filler composition is applied to a crack or small hole in a substrate with a brush, by spraying or with a trowel, depending on its viscosity. In addition, the composition can be applied to the substrate to form a surface coating. The filler composition is designed to not only fill the crack or hole, but can also be made to react with the liquid or material to be retained.

Although the composition will cure at room temperature, when cured at higher temperatures, the composition densifies to a higher degree. If the cracks are fine, densification improves the seal. For large cracks, densification adds to the stresses within the composition spanning or filling the crack. Densification of the composition is achieved by raising the temperature to not more than about 550° C., preferably not more than about 450° C. Heat may be applied by means of a heat gun, or by placing the item being repaired into an oven, if practical. When cured, a white, wipable film will form on the surface of the composition. Cracks appear to have a white filling through the otherwise slightly opaque composition.

The filler composition adheres to the substrate, assuring a good seal. Micrographs produced by scanning electron microscopy show a bond crossing the metal oxide film, aluminum and silicon migrating to the metal portion of the interface and iron, nickel and chromium from the metal moving to the ceramic composition portion.

Leachate testing was conducted by coating samples of stainless steel (304 L SS) with the composition and subjecting the samples to deionized water at 90° C. for time periods up to approximately 212 hours. The leachates were analyzed by inductively coupled plasma spectroscopy. The silicon component of the coating leached at a moderate rate, however, the aluminum particulates therein showed no significant leaching, even for thin coatings.

In other testing the coating was found to be hard and resistant to thermal shock. Most importantly for nuclear applications, coated substrates remained intact and leach-resistant after irradiating with a cobalt-60 source at a rate of $2.5 \times 10^6$ rads/hour to a total accumulated dose of $3 \times 10^8$ rads.

The following examples further illustrate the filler composition according to the present invention.

EXAMPLE 1

Four 0.0153" (about 0.039 cm) diameter holes were drilled in a mock-up of a nuclear reactor vessel. The composition was applied to the outside of the vessel with a small paint brush and cured with a heat gun. Water was placed inside the vessel and agitated with a magnetic stirrer as the vessel and its contents were heated to 90° C. No evidence of leakage was found after one year of testing.

EXAMPLE 2

Stress corrosion cracks were made in a 304L SS bolted plate by immersing it in a special chloride solution. The leak rate of helium through the stress corrosion cracks in the plate was measured at $3 \times 10^{-3}$ atmospheres-cm$^3$/sec. Then, the composition, made as described above, was applied with a brush and cured with a heat gun. After repair, the helium leak rate improved one-million-fold to $2 \times 10^{-9}$ atmospheres-cm$^3$/sec.

EXAMPLE 3

Thirty holes were drilled in a three-inch (about 7.6 cm) diameter pipe. The composition was applied to the holes on the outside of the pipe and cured. A cement-based material was applied over the coating to improve mechanical stability. A 15% nitric acid solution at a pressure of more than 30 psig was flowed through the pipe for over 1100 hours. No evidence of leakage through the holes was detected.

EXAMPLE 4

A 304L stainless steel bell was fitted with a tube and welded to a steel plate. The weld was intentionally done defectively so as to create cracks or leaks. The combined unit was placed in a water bath, pressurized, and examined to locate air leaks. After withdrawing the unit from the bath, the fiber composition was brushed into the leaking cracks and allowed to air dry. The unit was returned to the bath and repressurized. The coated crack began to leak when the pressure reached 20 psi, but stopped by itself and remained stopped as pressure was further increased.

EXAMPLE 5

The composition was applied to cracks in glass laboratory beakers. The beakers filled with a colored solution and placed on paper towels. No discoloration of the paper towels was observed.

EXAMPLE 6

A plastic syringe opening was filled with the composition. Under no pressure, the leak through the opening stopped. Under increases in pressure, the leak continued but at a reduced rate. At steady pressure, the leak decreased in time.

It will be apparent to those skilled in the art that many changes and substitutions can be made to the preferred embodiment herein described without departing from the spirit and scope of the present invention as defined by the appended claims.

What is claimed is:

1. A process for making a composition suitable for coating a substrate, said process comprising the steps of:

mixing ethanol and water to form a first mixture;

adjusting the pH of said first mixture into the acid range;

mixing ethanol and tetraethyl orthosilicate to form a second mixture;

adding said first mixture to said second mixture to form a third mixture having a pH in the acid range;

maintaining the pH of said third mixture in the acid range;

stirring said third mixture;

aging said third mixture at room temperature; and mixing a particulate material with said third mixture.

2. The process as recited in claim 1, wherein said first mixture contains approximately two to five parts ethanol to one part water.

3. The process as recited in claim 1, wherein said second mixture contains approximately one part ethanol to two parts tetraethyl orthosilicate.

4. The process as recited in claim 1, wherein said third mixture contains approximately one part of said first mixture to two parts of said second mixture.

5. The process as recited in claim 1, wherein the aging of said third mixture is less than approximately 24 hours.

6. The process as recited in claim 1, wherein the aging of said third mixture is at least approximately 24 hours.

7. The process as recited in claim 1, wherein said particulate material is selected from the group consisting of alumina, silicon, lead, cesium, zirconium, and mixtures thereof.

8. The process as recited in claim 1, wherein said particulate material is selected from the group consisting of alumina, silicon, lead, cesium, zirconium, and mixtures thereof, and said method further comprises the steps of:

applying said composition in a substrate, and raising the temperature of said composition to not more than 550° C. during to cure said composition.

9. The process as recited in claim 1, wherein said particulate material is an indicator having optical characteristics that vary when said indicator contacts an analyte, said characteristics varying in proportion to the concentration of said analyte.

10. The process as recited in claim 1, wherein said particulate material has a melting point, further comprising the steps of:
   applying said composition to a substrate; and
   curing said composition at a temperature less than said melting point.

11. The process as recited in claim 1, wherein said particulate material has a decomposition point, further comprising the steps of:
   applying said composition to a substrate; and
   curing said composition at a temperature less than said decomposition point.

12. A product made by a process comprising the steps of:
   mixing ethanol and water to form a first mixture;
   adjusting the pH of said first mixture into the acid range;
   mixing ethanol and tetraethyl orthosilicate to form a second mixture;
   adding said first mixture to said second mixture to form a third mixture having a pH in the acid range;
   maintaining the pH of said third mixture in the acid range;
   stirring said third mixture;
   aging said third mixture at room temperature;
   mixing a particulate material with said third mixture to form a slurry, said material having a particle size less than approximately 200 um, said material being selected from the group consisting of alumina, silicon, lead, cesium, zirconium, and mixtures thereof;
   applying said slurry to a substrate; and
   curing said slurry.

13. The product as recited in claim 12, wherein said substrate is metal, further comprising the step of raising the temperature of said slurry to not more than 550° C. during curing.

14. The product as recited in claim 12, wherein curing of said slurry takes place at room temperature.

15. The product as recited in claim 12, wherein said first mixture contains approximately two to five parts ethanol to one part water, and wherein said second mixture contains approximately one part ethanol to two parts tetraethyl orthosilicate.

16. The product as recited in claim 12, wherein the pH of said first mixture is adjusted to be in the range of approximately 0.5 to 3.0.

17. The product as retired in claim 12, wherein said slurry contains approximately 0.4 to 0.8 grams of said particulate material per milliliter of said third mixture.

18. The composition as recited in claim 12, wherein the size of said particulate material is in the range of approximately 0.01 µm to 50 µm.

19. The composition as recited in claim 12, wherein the size of said particulate material is between approximately 0.01 µm and 5 µm.

20. A product made by a process comprising the steps of:
   mixing ethanol and water to form a first mixture;
   adjusting the pH of said first mixture into the acid range;
   mixing ethanol and tetraethyl orthosilicate to form a second mixture;
   adding said first mixture to said second mixture to form a third mixture having a pH in the acid range;
   maintaining the pH of said third mixture in the acid range;
   stirring said third mixture;
   aging said third mixture at room temperature;
   mixing an optical indicator with said third mixture, said indicator having optical characteristics that vary when said indicator contacts a fluid containing an analyte of interest, said characteristics varying in proportion to the concentration of said analyte;
   applying said composition to a substrate; and
   curing said composition.

21. The product as recited in claim 20, wherein said first mixture contains approximately two to five parts ethanol to one part water, wherein said second mixture contains approximately one part ethanol to two parts tetraethyl orthosilicate, and wherein said third mixture contains approximately one part of said first mixture to two parts of said second mixture.

22. The product as recited in claim 20, wherein the pH of said first mixture is adjusted to be in the range of approximately 0.5 to 3.0.

23. The product as recited in claim 20, wherein said third mixture contains up to approximately 20 parts water to one part tetraethyl orthosilicate.

24. The product as recited in claim 20, wherein said optical indicator has a particle size less than approximately 100 µm.

25. The product as recited in claim 20, wherein 100 grams of said composition contains up to approximately 40 grams of said optical indicator.

26. The product as recited in claim 20, wherein said optical indicator has a melting point, and said curing step takes place at a temperature less than said melting point.

27. The product as recited in claim 20, wherein said optical indicator has a decomposition point, and said curing step takes place at a temperature less than said decomposition point.

28. The product as recited in claim 20, wherein said optical indicator is selected from the group consisting of pH indicators, redox indicators, adsorption indicators, metallochromic indicators, and specific ion indicators.

29. The method as recited in claim 20, further comprising the steps of:
   allowing said composition to interact with said analyte;
   directing light through said composition so that at least a portion of said light passes through said composition and emerges therefrom;
   detecting said at least a portion of said emerging light; and
   analyzing said detected light to determine the concentration of said analyte in said fluid.

30. The method as recited in claim 20, further comprising the steps of:
   applying said composition to a flow cell, said flow cell including
     a passageway for said stream to pass through said flow cell, said passageway defining a flow path,
     said composition applied to opposing sides of said passageway parallel to said flow path, said composition in direct contact with said passageway, said composition positioned so that light directed approximately transverse to said flow path passes through said composition before and after reaching said stream, said composition interacting with said analyte to produce a change in an optical characteristic of said indicator.

31. The method as recited in claim 20, further comprising the steps of:
   applying said composition to a flow cell, said flow cell including
     a passageway for said stream to pass through said flow cell, said passageway defining a flow path, said passageway having walls with removable windows, said windows disposed on opposing sides of said passageway parallel to said flow path, said composition applied to said windows so that light directed approximately transverse to said flow path passes through said windows and said composition before and after reaching said stream, said composition interacting with said analyte to produce a change in an optical characteristic of said indicator.

* * * * *